United States Patent [19]

LaSarge et al.

[11] Patent Number: 4,507,737
[45] Date of Patent: Mar. 26, 1985

[54] HEADING REFERENCE AND LAND NAVIGATION SYSTEM

[75] Inventors: Eugene A. LaSarge; Franciscus Schermers, both of Grandville; Daniel L. Sugarbaker, Grand Rapids, all of Mich.

[73] Assignee: Lear Siegler, Inc., Santa Monica, Calif.

[21] Appl. No.: 313,207

[22] Filed: Oct. 20, 1981

[51] Int. Cl.³ .............................................. G06F 15/50
[52] U.S. Cl. .................................... 364/453; 364/436; 73/178 R; 340/967
[58] Field of Search .................. 364/453 O, 436, 443, 364/432, 434, 457, 450, 449, 424; 73/178 R; 340/27 NA

[56] References Cited

U.S. PATENT DOCUMENTS

| | | | |
|---|---|---|---|
| 3,763,358 | 10/1973 | Cargille | 364/453 |
| 3,925,642 | 12/1975 | Roantree | 364/457 |
| 4,038,527 | 7/1977 | Brodie et al. | 364/453 |
| 4,106,094 | 8/1978 | Land | 364/453 |
| 4,114,437 | 9/1978 | Krogmann | 364/450 |
| 4,212,443 | 7/1980 | Duncan | 364/453 |
| 4,254,465 | 3/1981 | Land | 364/454 |
| 4,321,678 | 3/1982 | Krogmann | 364/450 |
| 4,347,573 | 8/1982 | Friedland | 364/453 |

Primary Examiner—Jerry Smith
Assistant Examiner—Michael R. Fleming
Attorney, Agent, or Firm—Varnum, Riddering, Schmidt & Howlett

[57] ABSTRACT

A heading reference system (100) for sensing vehicle heading relative to fixed inertial space is mountable in a vehicle such as a land-based vehicle and includes a two-degree-of-freedom (TDF) dynamically tuned gyroscope (150) responsive to vehicle rotation about pitch and yaw axes for generating rate signals indicative of the rotation. A caging loop (160) generates force signals for torquing the gyroscope (150) to a null position. A pair of accelerometers (186, 187) are responsive to misalignment of the vehicle relative to a horizontal plane formed by the pitch and roll axes. Processor circuitry (180) is responsive to the force signals, the misalignment of the vehicle relative to pitch and roll axes, and distance signals generated by an odometer unit (140) to apply heading signals to an indicator unit (120) for visually indicating to a vehicle operator the directional heading.

6 Claims, 7 Drawing Figures

OPERATIONAL MODE

HEADING REFERENCE AND LAND NAVIGATION SYSTEM

BACKGROUND OF THE INVENTION

1. Field of the Invention

This invention relates to inertial guidance and navigation systems and, more particularly, relates to a strapped down heading reference system for use with vehicles having limited pitch and roll altitudes such as land vehicles to provide accurate indications of vehicle position relative to a fixed reference axis.

2. Description of the Prior Art

Inertial guidance/navigation systems are commonly employed in both aircraft and space vehicles. These systems often comprise highly complex electronic circuitry and are substantially expensive, though not relative to the vehicles on which they are used. One particular type of guidance/navigation system is often referred to as a "heading reference system" and provides an indication of the direction toward which the aircraft is moving or "pointed," relative to a reference line, such as "true north."

When these systems are specifically adapted for aircraft guidance and navigation, they commonly employ gyroscopic rate sensors to detect vehicle movement, accelerometers to detect the rate of change of aircraft velocity and alignment, and electronic processing circuitry for computing heading indications from the various output signals of the gyroscopic and accelerometer units. One example of a heading reference system is described in the U.S. patent to Lerman et al. U.S. Pat. No. 3,281,581, issued Oct. 25, 1966. The Lerman et al. patent describes a gyrocompassing system suitable for use in aircraft applications and employs an inertial platform arrangement comprising three gyros and two accelerometers with an associated processing unit for computing various parameters of the reference system.

Heading reference systems having single-degree-of-freedom (SDF) and two-degree-of-freedom (TDF) rate sensing gyroscopes strapped down to the aircraft vehicle are also being utilized, especially since the development of lower cost two-axis rate gyros and small, lightweight digital computing apparatus having substantial processing capabilities. The U.S. Pat. No. 4,121,443 to Duncan et al., issued July 15, 1980, describes a strapped down attitude and heading reference system employing a skewed axis arrangement of two TDF rate gyros with three accelerometers applying input signals to a digital computer.

Heading reference systems are also used in land-based vehicles. For example, in the U.S. Pat. No. 4,060,718 to Huddle, issued Nov. 29, 1977, a system employing a heading reference arrangement is adapted for use in a geodetic survey method whereby earth density differentiations are indicated by deflections of a gravity vector from its expected modeled position. The reference system includes gyroscopes, a set of three mutually orthogonal accelerometers and a data processing unit for calculating gravity vector deflections. The Huddle system is not adapted specifically to vehicle guidance or navigation functions.

Heading reference systems for land-based vehicle guidance are becoming significantly important. For example, with respect to military vehicles such as armored tanks, the recent developments in electronic technology for weapons have mandated the necessity of accurate vehicle reference systems capable of use in severe environments. The design of heading reference systems for land-based vehicles is limited by several constraints. For example, such systems must be small to minimize space requirements. Additionally, in view of the relative number of vehicles on which the reference systems are installed, their cost must also be minimized. Other requirements of such systems include accuracy on unlevel terrain, simplicity of use by vehicle crew members, substantial reliability in a severe vibrational environment, and an absence of magnetic materials so that neither electromagnetic countermeasures by opposing military forces nor metallic materials of other vehicle components can interfere with the system operations. Still further, such heading reference systems should be autonomous, i.e. operate independently of other vehicle systems, and the systems should be entirely self-contained within the vehicle. If possible, the reference systems should also be portable and easy to install in the vehicle so that such systems can be readily replaced or changed to another vehicle by the vehicle crew in the field without requiring any complex calibrations. Finally, the reference systems should minimize any use of radio communications for purposes of security.

Many military armored vehicles presently use a hand-held magnetic compass system as the primary means of determining vehicle heading. Such compass systems require a vehicle crew member to dismount from the vehicle and position himself far enough from the vehicle so as not to have the magnetic components of the vehicle produce an erroneous reading. Clearly, such procedures are unacceptable in terms of safety and are essentially impossible to perform during the night or in conditions of poor visibility.

SUMMARY OF THE INVENTION

Advantageously, a self-contained strapped-down heading reference system is adapted for use in a land-based vehicle and includes gyroscopic means for sensing the vehicle rotation about a yaw axis and a pitch axis, both axes being mutually perpendicular to a roll axis corresponding to the direction of travel of the vehicle. A heading system in accordance with the invention further provides for accelerometer means and measuring means for visually indicating a directional vehicle heading relative to a reference azimuth axis with compensation provided thereby for misalignment of the vehicle and for distance travelled by the vehicle subsequent to an initialization of the system.

In a heading reference system in accordance with the invention, the gyroscopic means can be mounted in a fixed position relative to the vehicle for sensing vehicle rotation rates about the yaw axis which is in fixed position relative to the vehicle and parallel to the azimuth axis when the vehicle is on level terrain. The pitch axis is perpendicular to both the azimuth axis and to a roll axis corresponding to the direction of travel of the vehicle. The gyroscopic means generates rate signals indicative of the sensed vehicle rotation.

The accelerometer means measures the magnitude of vehicle acceleration only about the roll and pitch axes, and generates acceleration signals indicative of misalignment of the vehicle relative to a horizontal plane formed by these axes. In addition, the measuring means generates a displacement signal so as to provide a ground-referenced displacement of the vehicle relative to an initialization position.

Caging circuit means are coupled to the gyroscopic means and are responsive to the rate signals for generating force signals corresponding to the magnitude of forces necessary to align the gyroscopic means to an initial null position. A processor means is responsive to the force signals, the acceleration signal and the distance or velocity signal and generates a heading signal representative of the angular deviation of the direction of the vehicle relative to the azimuth axis. The processor means is also responsive to the displacement signal for compensating the heading signal in accordance with the distance travelled by the vehicle. The measuring means can comprise means for measuring the distance travelled by the vehicle and the displacement signal can be directly indicative thereof. The measuring means can also comprise means for measuring the velocity of the vehicle, with the displacement signal directly indicative thereof.

Further in accordance with the invention, the gyroscopic means comprises means for measuring the temperature of the components thereof and generating a temperature compensation signal representative of the same. The processor means is responsive to the compensation signal for compensating the heading signal for deviations of the temperature of the gyroscopic means from a predetermined temperature.

In one illustrative embodiment of the invention, the gyroscopic means comprises a two-degree-of-freedom dynamically tuned gyroscope and the accelerometer means comprises first and second accelerometers. The first accelerometer is mounted in the housing, responsive only to vehicle acceleration along the roll axis, and generates a first one of the acceleration signals. The second accelerometer is also mounted in the housing, responsive only to vehicle acceleration along the pitch axis, and generates a second one of the acceleration signals.

BRIEF DESCRIPTION OF THE DRAWINGS

The invention will now be described with reference to the drawings in which.

DESCRIPTION OF THE PREFERRED EMBODIMENT

Figure 1:
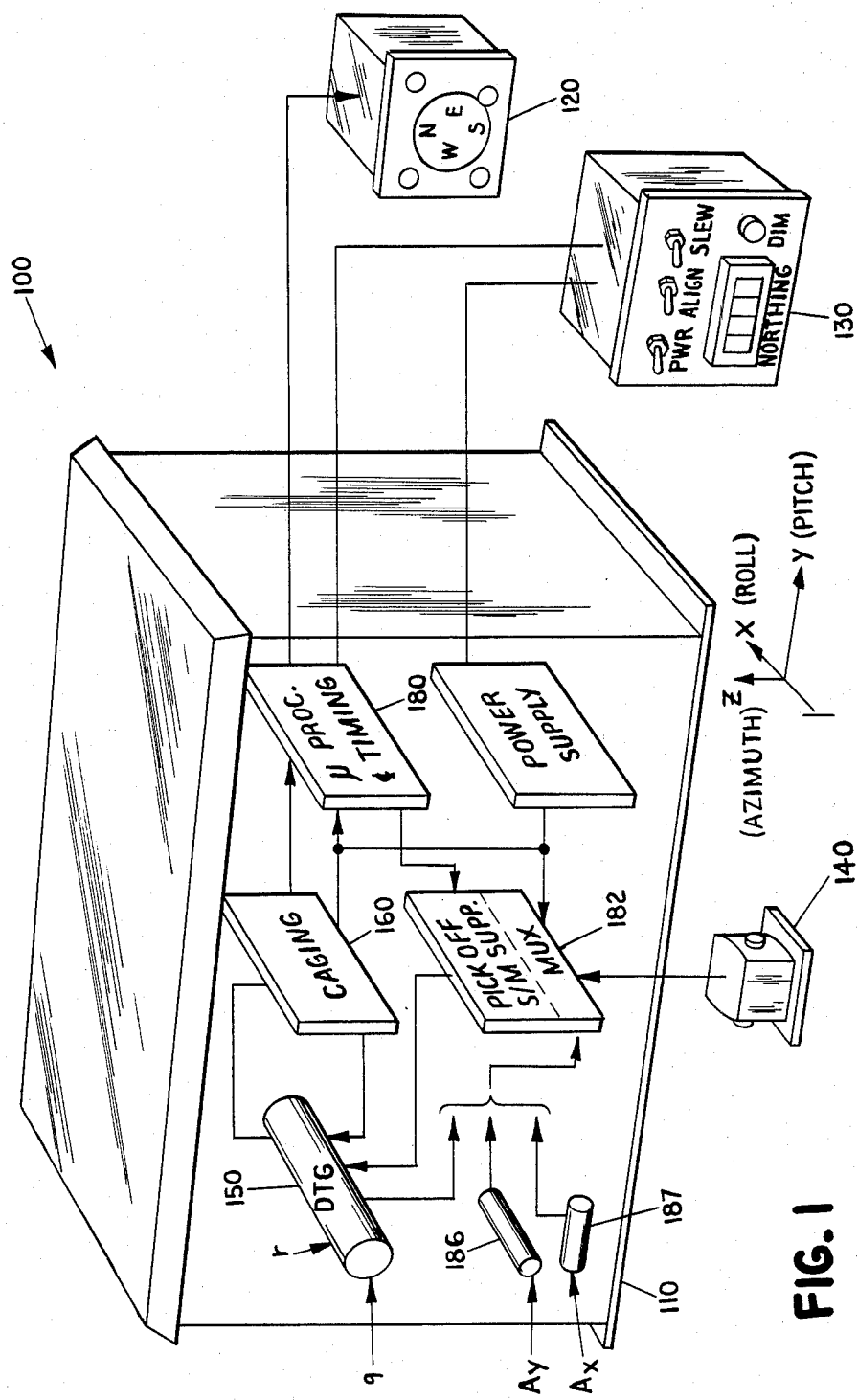
FIG. 1 is a structural diagram of one illustrative embodiment of a heading reference system in accordance with the invention.

The principles of the invention are disclosed, by way of example, in a heading reference system 100 as structurally depicted in FIG. 1. A system of this type can be utilized in vehicles such as land-based vehicles (not shown) for providing a visual indication of vehicle heading to crew members. The reference system 100 is a strapped down inertial reference system which is distinguishable from a "gimballed" or other similar types of inertial platform arrangements where a platform mounting the rate sensing components is to be kept stationary in inertial space. Rate sensing components of the strapped down system, on the other hand, remain in fixed position relative to the vehicle on which they are mounted.

For purposes of reference, the system 100 is depicted in FIG. 1 with respect to three mutually orthogonal axes X, Y and Z. Axis X is fixed with respect to inertial space and the orientation of system 100 within the vehicle, and corresponds to the direction of travel of the vehicle. This axis is commonly referred to as the "roll" axis. Correspondingly, axis Y is also fixed with respect to orientation of system 100 within the vehicle, is commonly referred to as the "pitch" axis and forms a horizontal plane with axis X corresponding to the normally level plane of the vehicle. Correspondingly, axis Z is referred to as the "azimuth" axis, is mutually perpendicular to both axes X and Y, and is fixed with respect to inertial space. A further axis which can be defined for purposes of description of system 100 is a "yaw" axis which is fixed in relation to orientation of system 100 within the vehicle, and is parallel to the azimuth axis when the vehicle is level. Also for purposes of description, the rate of angular rotation of the vehicle about the roll axis will be referenced herein by the letter "p." Similarly, rotation about the pitch axis will be referenced by the letter "q." The letter "r" will refer to vehicle rotation about the yaw axis. The symbols $A_y$ and $A_x$ will hereinafter refer to acceleration rates of the vehicle along the pitch and roll axes, respectively.

As depicted in FIG. 1, the heading reference system 100 comprises a reference unit 110, an indicator unit 120, a reference system controller 130 and an odometer unit 140. Each of the aforereferenced components of system 100 is self-contained, nonmagnetic and of a size easily adapted to be mounted within a land-based vehicle. In accordance with the invention, the system 100 comprises various electronic and rate sensing components which are responsive to position, velocity and acceleration parameters of the vehicle to generate signals indicative of the vehicle heading. An electrical block diagram of the system 100 is depicted in FIG. 2.

Figure 2:
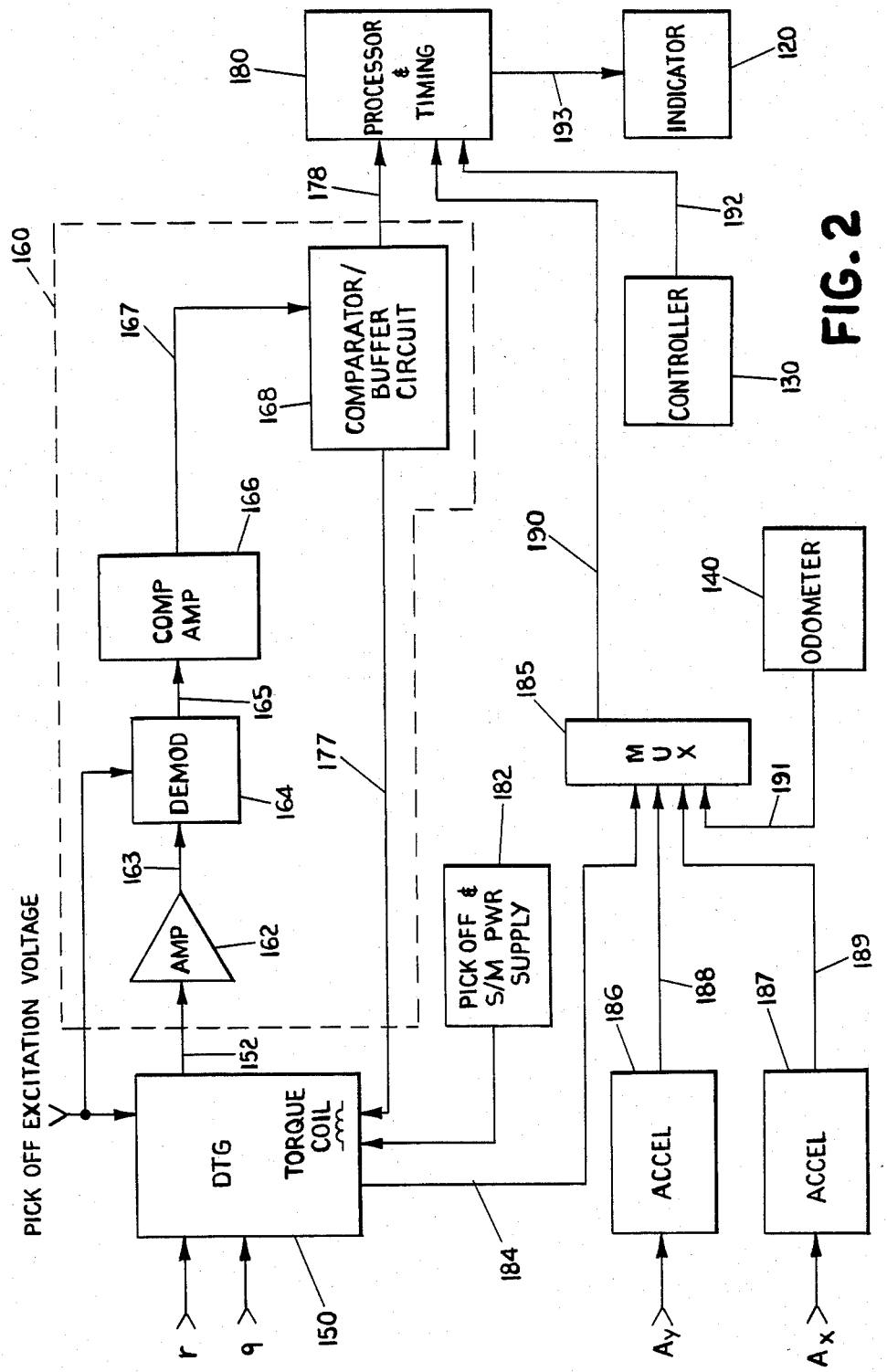
FIG. 2 is a block diagram of the electrical circuitry of the heading reference system depicted in FIG. 1.

Referring to FIG. 2, the heading reference unit 110 comprises a dynamically tuned gyroscope 150. Gyro 150 is a two-axis tuned rotor gyroscope (TRG) which is responsive to angular rotation of the vehicle about the pitch and yaw axes to generate signals indicative of these rotations. The yaw and pitch rotation rates are symbolically depicted as input signals r and q, respectively, to the gyro 150 in FIG. 2. Dynamically tuned gyroscopes of this type are well known in the art of inertial guidance and navigational system design. For example, a suitable type of gyroscope is described in the U.S. Pat. No. 4,286,370 to Craig, issued Sept. 1, 1981, and incorporated by reference herein.

The gyro 150 generates an output signal on line 152 indicative of the rotation about the pitch and yaw axes. This signal is applied to a caging loop 160 (commonly referred to as a "torquing" loop) for providing feedback signals to the gyro 150 to rebalance the rotor (not shown) therein and for applying signals to various processing circuitry indicative of the magnitude of signals necessary to provide such rebalance, thereby providing an indication of the magnitude and direction of rotation about the pitch and yaw axes. The structure and operations of caging loops is well known in the art of gyroscopic design and such loops can be in the form of either analog or digital circuit arrangements.

To better understand the function of caging loop 160, the gyro 150 can, for example, have a physical configuration comprising spinning elements supported by bearings in a cantilevered fashion. Included in the spinning elements is an inertial wheel attached to a shaft by a mechanical suspension. Attached to the inertial wheel are permanent magnets which provide a magnetic field to react with current flowing in a torque coil within the gyro 150 and depicted in FIG. 2. The inertial wheel also provides an air gap and variable reluctance path for the fixed position pick-off coils commonly known within gyroscopic design.

One function of the digital loop 160 is to rebalance the inertial wheel by sensing displacement from the pick-off coils. This pick-off coil signal is the output signal on line 152 and basically corresponds to an imbalance signal from conventional pick-off circuitry indicative of the motion of the gyro with respect to the pitch and yaw axes. This signal is applied to a high-gain amplifier 162 which amplifies the signal and applies the amplified signal on line 163 to a demodulator circuit 164.

The resultant demodulated signal is applied on line 165 as an input to a loop compensation amplifier 166. The compensated output signal of amplifier 166 is applied to a comparator/buffer circuit 168 wherein the compensated signal is processed to generate a torquing signal on line 177 proportioned to the original error signal produced by the pick-off coils. The torquing signal is of requisite magnitude and polarity to drive the pick-off to their original null position.

Also generated by comparator/buffer circuit 168 is a digital pulse train signal on line 178 which provide a proportional binary representation of the torquing signal on line 177. The basic output signal of the digital buffer circuit 172 is applied as an input signal to processor and timing circuit 180 on line 178. This signal will be described in greater detail in subsequent paragraphs hereof.

The reference unit 110 also comprises pick-off and spin-motor power supply circuitry 182 which is symbolically depicted as an input to gyro 150 and which provides a pick-off excitation voltage to both the pick-off coils of gyro 150 and the demodulator circuit 164 of caging loop 160. The power supply circuit 182 also provides power for the various spin motors of the gyro 150.

The gyro 150 also provides a temperature compensation signal corresponding to the temperature of the gyro 150 and applies this signal on line 184 as an input signal to multiplexor bus circuit 185. The temperature compensation signal is utilized by the processor circuitry 180 to compensate for rate sensing deviations due to temperature changes of the gyro 150 during normal operation.

The reference unit 110 further comprises a pair of accelerometer circuits 186 and 187. As depicted in FIG. 2, accelerometer circuit 186 is responsive to acceleration $A_y$ of the vehicle along the Y or pitch axis and provides a signal indicative of such acceleration on line 188. Correspondingly, accelerometer circuit 187 is responsive to acceleration $A_x$ along the X or roll axis and applies a signal indicative of such acceleration on line 189. The acceleration indication signals on lines 188 and 189 are applied as input signals to multiplexer bus circuit 185 which is electrically connected through a bus line 190 to input these signals to the processor and timing circuit 180. The acceleration indication signals on lines 188 and 189 are utilized by the processor circuit 180 to compensate the computation of vehicle heading for mislevel of the vehicle with respect to the plane formed by the pitch and roll axes. Without such compensation, significant heading errors can occur during both alignment and operation of the heading system 100. In actual operating conditions, pitch and roll angles of up to plus or minus 30° can be expected in military land-based vehicles.

The odometer unit 140 is a conventional odometer circuit utilized to provide a ground-referenced displacement of the vehicle relative to an initialization position. In accordance with the invention, unit 140 provides a means for distinguishing signals generated by accelerometers 186 and 187 indicative of actual vehicle velocity rate changes from signals indicative of vehicle mislevel. That is, accelerometers 186 and 187 generate signals whether the vehicle is actually accelerating or is merely stationary but mislevel. These signals, applied to multiplexer 185 on lines 188 and 189, do not contain information sufficient to determine if actual acceleration has occurred. However, by further providing information as to vehicle velocity (or distance traveled), the components of the acceleration signals due to vehicle mislevel can be determined. The odometer unit 140 provides an output signal on line 191 indicative of the ground-referenced displacement distance. The multiplexer circuit 185 is utilized to apply this distance measurement as an input signal to processor 180 on bus line 190.

Figure 3:
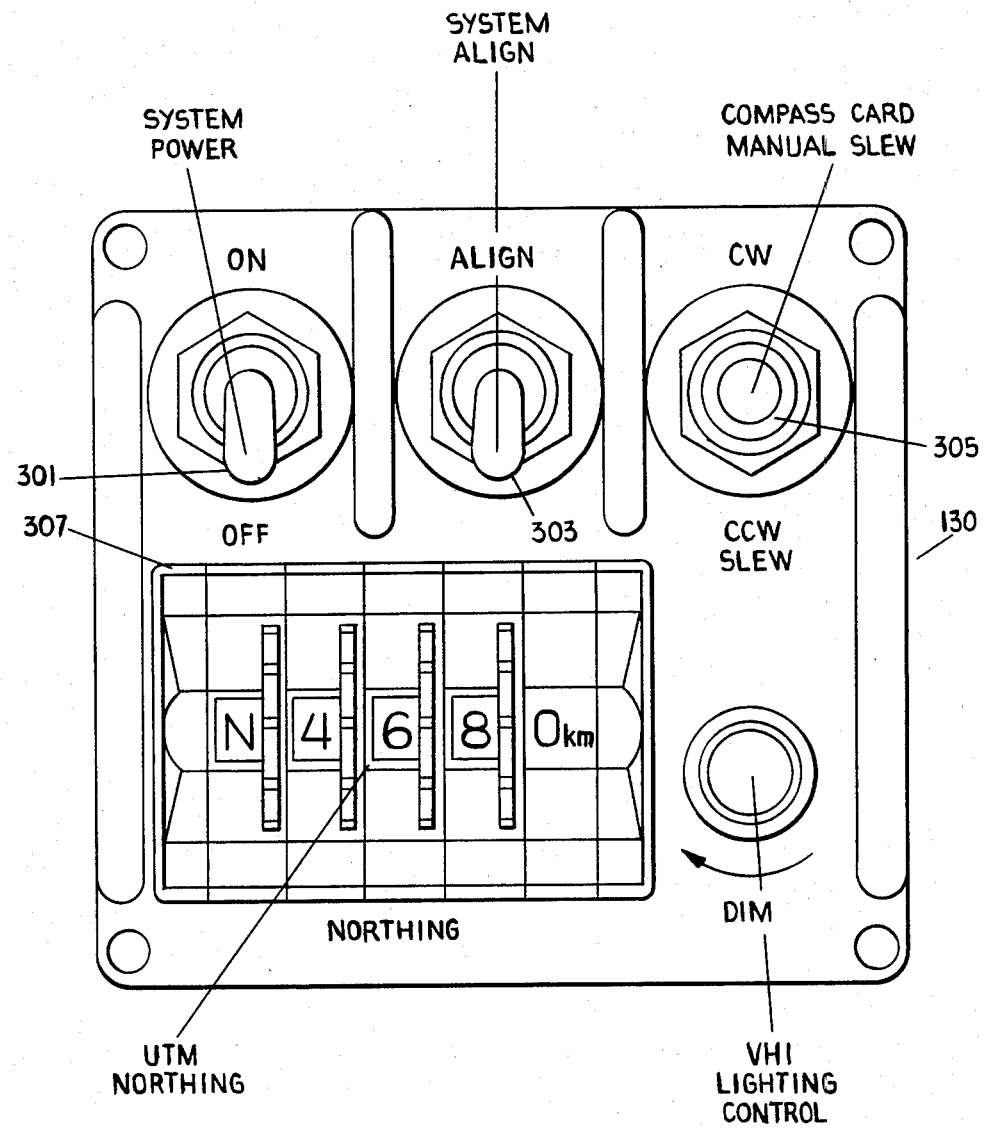
FIG. 3 is a structural diagram of the indicator unit of the heading reference system depicted in FIG. 1.

The controller unit 130 provides a means for manual input of various initialization and heading parameters to the system 100. These parameters are generated as output signals on line 192 and are applied directly as input signals to the processor circuitry 180. As depicted in FIGS. 1 and 3, the unit 130 includes a system power switch 301 for initialization of power to the system 100. The toggle switch 303 is labeled "ALIGN" and is utilized to initiate the the alignment mode of the system 100 as subsequently described herein. The "SLEW" toggle switch 305 is utilized when the heading for the system is to be manually inserted. The thumb-wheel switches designated as the "NORTHING" switch inputs 307 are utilized to manually insert a Northing coordinate of the well-known UTM ground reference system. The switch 309 is a lighting control switch for the heading system units.

Figure 4:
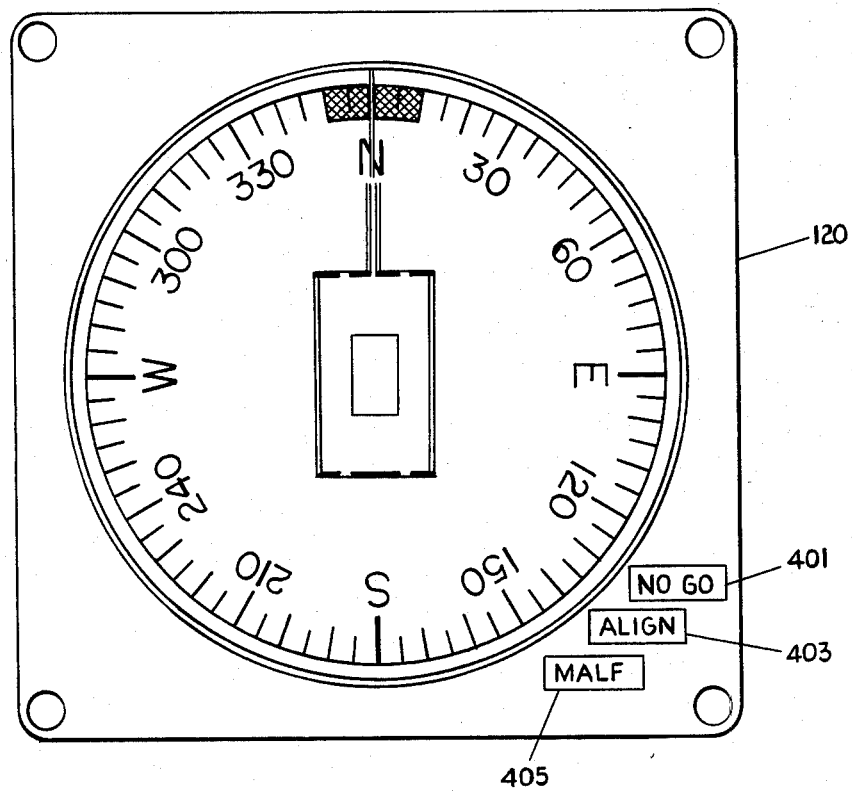
FIG. 4 is a structural diagram of the controller unit of the system depicted in FIG. 1.
Figure 5:
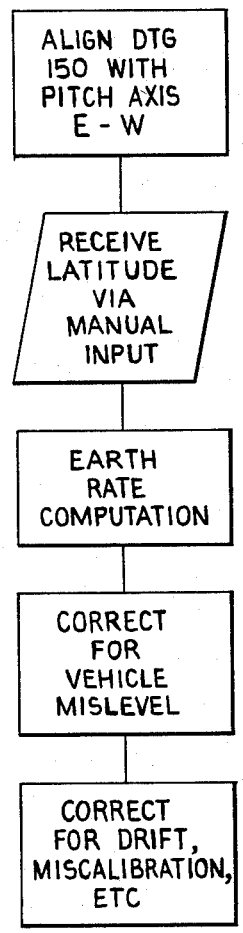
FIG. 5 is a diagram of one illustrative embodiment of operations of the processor circuitry of the reference system depicted in FIG. 1.

The processor and timing circuitry 180 can be any conventional processor. For example, an INTEL 8088 processor can be advantageously utilized due to its relatively small size and extensive processing capability. The processor 180 generates output signals on line 193 which are directly applied to the indicator unit 120. The incidator unit 120 provides a visual indication to the vehicle operator of the heading of the vehicle relative to a fixed reference point such as "true north." An exemplary indicator unit is depicted in FIG. 4 and includes a conventional 360° moving compass card with major labeled indices each 30°. Minor indices are also provided at 5° and 10° intervals. The vehicle symbol pointer shows vehicle heading and night vision is provided with an integral-dimmable red lighting, while system status is provided by three annunciator lights 401, 403 and 405. Light 401 indicates that the heading system is in a mode where no vehicle movement should occur. Annunciator light 403 indicates the heading system is in an alignment mode. Light 405 indicates a malfunction has occurred and a heading alignment function should be initialized. Each of lights 401, 403 and 405 are controlled by signals from processor circuitry 180. The compass card can be driven by a stepper motor under the control of the processor circuitry 180. The "SLEW" switch of the controller unit 130 is utilized when the heading is to be manually inserted by the vehicle crew members.

The operation of the system 100 will now be described with reference to FIGS. 2 and 5-7. All operations are basically controlled through the processor and timing circuitry 180. The system 100 has two basic modes of operation, namely an "alignment" mode and an "operate" mode. As depicted by sequence diagram in FIG. 5, in the alignment mode, the system 109 is basically initialized with respect to heading variables by obtaining a "true" gyro output after correction for errors measured on the basis of an assumed heading. To initialize the alignment mode, the system power switch 301 and alignment switch 303 on controller 130 are activated. The vehicle is then positioned so that the pitch axis (Y axis) is substantially in an East-West position, i.e., the vehicle is substantially directed toward true north. In a physical realization of a reference system in accordance with the invention, positioning of the vehicle within approximately ±30° of true north is sufficient for accurate alignment operations.

The processor circuitry 180 then receives the manually input latitude via controller 130 and computes an earth rate $w_{er}$ based on the earth rate calculated along the gyro pitch axis. It should be emphasized that the vehicle is stationary during the alignment mode. Correction signals are then applied to the aforementioned computations for vehicle mislevel by means of measurement of any acceleration signals generated by accelerometer circuits 186 and 187. With the vehicle stationary, the signals generated by circuits 186 and 187 are solely due to vehicle mislevel and output signals from odometer unit 140 are not utilized.

Correction signals are also applied to the computations for such errors as gyro drift, miscalibration, etc. These signals are derived from the temperature compensation signal generated by gyro 150 on line 184 as depicted in FIG. 2. Alignment is complete following correction in accordance with the temperature compensation signal.

Figure 6:
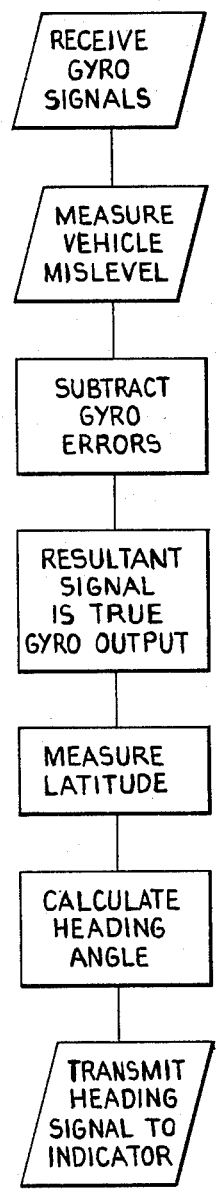
FIG. 6 is a sequence diagram of one illustrative embodiment of the operation of the processor circuitry of the reference system depicted in FIG. 1 during an operate mode.

In the operate mode, as depicted in the sequence diagram of FIG. 6, the gyro output signals are received by the processor circuitry 180 and vehicle mislevel and gyro output errors are "subtracted" from the gyro signals. In this mode, the output signals from odometer unit 140 are utilized to distinguish acceleration signals due to actual acceleration from those caused by vehicle mislevel. The resultant derived gyro signal is designated as a "true" gyro output. By measuring latitude and utilizing the previously derived earth rate along the pitch axis, a heading angle can be calculated and transmitted on line 193 to indicator unit 120.

Figure 7:
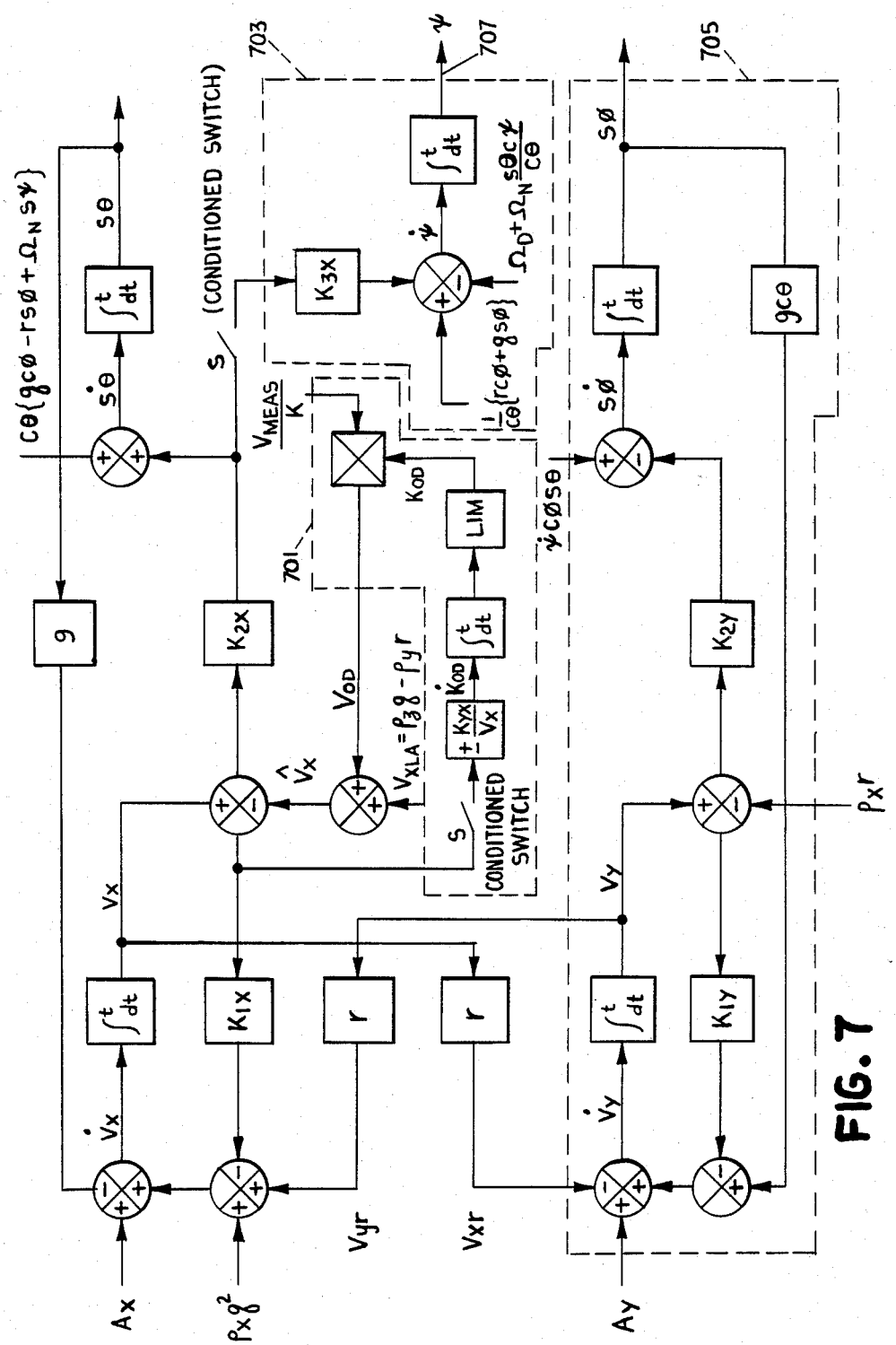
FIG. 7 is a sequence diagram of one illustrative embodiment of the general operation of the processor circuitry of the reference system depicted in FIG. 1.

To better understand the operations of heading system 100, FIG. 7 depicts a mathematical diagram of an exemplary set of operations in processor circuitry 180. As background information and as well known to those skilled in the art of navigational system design, when the system 100 is in a level condition, i.e., the vehicle is perpendicular to the azimuth axis, the expression for computing true north as a heading angle is as follows:

$$\psi = \text{Heading Angle} = \sin^{-1} \frac{\text{Earth rate along gyro pitch axis}}{w_{ER} \cos \lambda} \quad \text{(Eq. 1)}$$

where $w_{ER}$ is equal to the earth's rate of rotation and $\lambda$ is equal to the latitude. It should also be noted and will be apparent to those skilled in the art that the standard and well-known UTM NORTHING coordinate can be used in Equation 1 in substitution of latitude. In the operate mode, the processor circuitry 180 is responsive to the acceleration signals generated by accelerometer circuitry 186 and 187 to compensate computation of the vehicle heading due to mislevel conditions of the vehicle. As also previously discussed, the processor circuitry 180 is responsive to the temperature signals generated by gyro 150 on line 184 to compensate the vehicle heading computation for deviations due to temperature variance of the system 100.

Referring to FIG. 7, the variable symbols depicted therein have the following definitions:

$A_x$ = acceleration measured along roll axis
$A_y$ = acceleration measured along pitch axis
q = vehicle rate along pitch axis
r = vehicle rate along yaw axis $\left( \dfrac{V_{MEAS}}{K} \right)$ = odometer "velocity" measurement $\rho_x, \rho_y, \rho_z$ = lever arm displacements
$V_x$ = linear portion of $A_x$
$V_y$ = linear portion of $A_y$
$V_x$ = linear velicity along roll axis
$V_y$ = linear velocity along pitch axis
$\theta, \phi, \psi$ = pitch, roll and heading Euler angles
K . . . = selected system gains
g = gravity constant
$K_{OD}$ = odometer scale factor estimate
$\Omega_N$ = north component of earth rate vector
$\Omega_D$ = "down" component of earth rate vector
s, c = sine, cosine
$V_{OD}$ = odometer scale factor The mathematical structure of the operations performed in processor circuitry 180 is readily apparent from the diagram of FIG. 7. However, certain of the functions therein can be explained in greater detail. The functions associated with the computations in the block labeled 701 provide an estimate of the odometer scale factor. The scale factor associated with the odometer is measured in revolutions per mile and is a constant which differs slightly on a per-vehicle basis. The input through the condition switch in block 701 represents an error in the scale factor when the switch is closed. The switch is symbollically closed by the processor circuitry 180 when input to the circuitry 180 is representative of error in the odometer scale factor $V_{oD}$.

Referring now to block 703, when the condition switch associated with input block 703 is open, the standard procedure for computing a heading angle is utilized. When the switch is closed, automatic gyro compassing is occurring, thereby effectively subtracting from the computations dynamic error associated with the system 100. This condition switch is closed only when the vehicle is stationary and when the vehicle is operating in the previously described operate mode.

The block labeled 705 is a second-order damped feedback loop where the input $\rho_x r$ is a reference signal to force the computed velocity along the pitch axis to slave to that particular value. The loop shown in the upper portion of FIG. 7 is utilized in a similar manner. The resultant output of the sequential procedures performed in processor circuitry 180 is shown on line 707 as the heading angle $\psi$.

The principles of the invention are not limited to the specific heading reference system described herein for determining vehicle heading. It would be apparent to those skilled in the art that modifications and variations of the above-described illustrative embodiment of the invention may be effected without departing from the spirit and scope of the novel concepts of the invention.

The embodiments of the invention in which an exclusive property or privilege is claimed are defined as follows:

1. A self-contained strapped-down heading reference system for use in a land-based vehicle to provide a visual indication to vehicle operators of directional vehicle heading relative to a fixed reference azimuth axis, the heading system comprising:
    a housing for mounting the heading system in the vehicle, wherein the housing is oriented so as to define a roll axis corresponding to the direction of vehicle travel, a pitch axis perpendicular to the roll axis and forming a horizontal plane therewith when the vehicle is on level terrain, and a yaw axis mutually perpendicular to the pitch and roll axes and parallel to the azimuth axis when the vehicle is on level terrain;
    gyroscopic means mounted in the housing for sensing the rate of vehicle rotation about the yaw axis and the pitch axis, and for generating rate signals indicative of the sensed vehicle rotation;
    accelerometer means for measuring the magnitude of vehicle acceleration only along the roll and pitch axes and for generating acceleration signals indicative of the misalignment of the vehicle relative to a horizontal plane formed by the pitch and roll axes;
    circuit means coupled to the gyroscopic means and responsive to the rate signals for generating force signals corresponding to the magnitude of forces necessary to align the gyroscopic means to an initial null position;
    processor means responsive to the force signals and acceleration signals for generating a heading signal representative of the angular deviation of the direction of the vehicle relative to the azimuth axis;
    measuring means connected to the processor means for generating a displacement signal so as to provide a ground-referenced displacement of the vehicle relative to an initialization position; and
    the processor means is responsive to the displacement signal for compensating the heading signal in accordance with the distance travelled by the vehicle.

2. A heading reference system in accordance with claim 1 wherein the gyroscopic means further generates a temperature compensation signal representative of the temperature of the gyroscopic means; and
    the processor means is responsive to the temperature compensation signal for compensating the heading signal for deviations of the temperature of the gyroscopic means from a predetermined temperature.

3. A heading reference system in accordance with claim 1 wherein the gyroscopic means comprises a two-axis dynamically tuned gyroscope.

4. A heading reference system in accordance with claim 1 wherein the accelerometer means comprises first and second accelerometers, the first accelerometer being mounted in the housing and responsive only to vehicle acceleration along the roll axis for generating a first one of the acceleration signals, and the second accelerometer being also mounted in the housing and responsive only to vehicle acceleration along the pitch axis for generating a second one of the acceleration signals.

5. A heading reference system in accordance with claim 1 wherein the measuring means comprises means for measuring the distance travelled by the vehicle, and the displacement signal is directly indicative thereof.

6. A heading reference system in accordance with claim 1 wherein the measuring means comprises means for measuring the velocity of the vehicle, and the displacement signal is directly indicative thereof.

* * * * *